US012756916B2

(12) United States Patent
Dupre et al.

(10) Patent No.: US 12,756,916 B2
(45) Date of Patent: Oct. 6, 2026

(54) OPTICAL SYSTEMS INCLUDING META-LENSES

(71) Applicant: QUALCOMM Incorporated, San Diego, CA (US)

(72) Inventors: Matthieu Jean Olivier Dupre, La Jolla, CA (US); Jian Ma, San Diego, CA (US); Sergiu Radu Goma, Sedona, AZ (US); Biay-Cheng Hseih, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 18/757,093

(22) Filed: Jun. 27, 2024

(65) Prior Publication Data

US 2026/0006305 A1 Jan. 1, 2026

(51) Int. Cl.
*H04N 5/335* (2011.01)
*G02B 1/00* (2006.01)
*H04N 23/55* (2023.01)

(52) U.S. Cl.
CPC ............. *H04N 23/55* (2023.01); *G02B 1/002* (2013.01)

(58) Field of Classification Search
CPC ........................................................ G02B 1/002
See application file for complete search history.

(56) References Cited

U.S. PATENT DOCUMENTS

| | | | | |
|---|---|---|---|---|
| 11,706,400 | B2 * | 7/2023 | Kim | G06T 7/521 348/46 |
| 2021/0028215 | A1 * | 1/2021 | Devlin | H10F 39/806 |
| 2022/0155504 | A1 * | 5/2022 | Hsieh | G02B 1/002 |
| 2023/0012003 | A1 * | 1/2023 | Ma | G02B 7/021 |
| 2023/0247913 | A1 | 8/2023 | Nishio et al. | |
| 2023/0314776 | A1 * | 10/2023 | Yi | G02B 1/002 |
| 2024/0085678 | A1 | 3/2024 | Peng et al. | |
| 2024/0118452 | A1 * | 4/2024 | Yang | G02B 5/008 |
| 2024/0125591 | A1 * | 4/2024 | Gu | G01B 11/22 |
| 2025/0006759 | A1 * | 1/2025 | Siddique | H10F 39/024 |

OTHER PUBLICATIONS

International Search Report and Written Opinion PCT/US2025/033644 ISA/EPO Oct. 14, 2025.

* cited by examiner

*Primary Examiner* — Gary C Vieaux
(74) *Attorney, Agent, or Firm* — QUALCOMM Incorporated

(57) ABSTRACT

Systems and techniques are provided for optical systems including meta-lenses. For example, an apparatus can include an image sensor including a surface having a first region and a second region, the surface intersecting with an optical axis. The second region extends beyond one or more edges of the first region. The apparatus includes a substrate including a meta-lens, the optical axis intersecting with the meta-lens and the substrate. A cross-section of the substrate extends beyond the second region of the image sensor in at least one direction along the surface of the image sensor. The apparatus includes a spacer structure disposed between the substrate and the image sensor.

20 Claims, 13 Drawing Sheets

OPTICAL SYSTEMS INCLUDING META-LENSES

FIELD

The present disclosure generally relates to optical systems utilizing meta-lenses. In some examples, aspects of the present disclosure are related to systems and techniques related optical systems including meta-lenses.

BACKGROUND

Many devices and systems include optical elements, such as lenses for focusing light onto an image sensor. For example, a camera or a device including a camera with such optical elements can capture a frame or a sequence of frames of a scene (e.g., a video of a scene). In order to achieve desirable optical characteristics (e.g., including but not limited to sharpness, wide field of view, among others), the camera or camera device can utilize refractive lenses to focus incoming light onto an optical sensor. In some cases, a lens for a camera device can be a compound lens that includes multiple refractive lens elements stacked together. In some cases, the overall thickness of the compound lens stack can add additional size to a device that includes the compound lens stack.

Meta-lenses can provide an alternative to refractive lenses. Meta-lenses can be formed by fabricating nanometer scale (also referred to herein as nanoscale) geometric structures on a substrate material. The nanoscale geometric structures can control the transmission, polarization, and phase of light passing through the nanoscale geometric structures based on physical characteristics (e.g., height, width, length, diameter, etc.) of the nanoscale geometric structures. In some cases, meta-lenses can be fabricated using a fabrication technique, such as electron beam (e-beam) lithography.

SUMMARY

According to at least one illustrative example, a method of optical detection is provided. The method includes: receiving, at a substrate comprising a meta-lens, light from a scene, wherein an optical axis intersects with the meta-lens and the substrate; and receiving the light from the scene at an image sensor, the image sensor comprising a surface having a first region and a second region, the surface intersecting with the optical axis, wherein the second region extends beyond one or more edges of the first region and wherein a cross-section of the substrate extends beyond the second region of the image sensor in at least one direction along the surface of the image sensor.

In another example, an apparatus is provided. The apparatus includes: an image sensor comprising a surface having a first region and a second region, the surface intersecting with an optical axis, wherein the second region extends beyond one or more edges of the first region; a substrate comprising a meta-lens, the optical axis intersecting with the meta-lens and the substrate, wherein a cross-section of the substrate extends beyond the second region of the image sensor in at least one direction along the surface of the image sensor; and a spacer structure disposed between the substrate and the image sensor.

In another example, a non-transitory computer-readable medium is provided that has stored thereon instructions that, when executed by one or more processors, cause the one or more processors to: receive, at a substrate comprising a meta-lens, light from a scene, wherein an optical axis intersects with the meta-lens and the substrate; and receive the light from the scene at an image sensor, the image sensor comprising a surface having a first region and a second region, the surface intersecting with the optical axis, wherein the second region extends beyond one or more edges of the first region and wherein a cross-section of the substrate extends beyond the second region of the image sensor in at least one direction along the surface of the image sensor.

In accordance with another embodiment of the present disclosure, an apparatus for calibrating a phased array antenna is provided. The apparatus includes: means for receiving, at a substrate comprising a meta-lens, light from a scene, wherein an optical axis intersects with the meta-lens and the substrate; and means for receiving the light from the scene, the means for receiving the light from the scene comprising a surface having a first region and a second region, the surface intersecting with the optical axis, wherein the second region extends beyond one or more edges of the first region and wherein a cross-section of the substrate extends beyond the second region of the image sensor in at least one direction along the surface of the image sensor.

In some aspects, one or more of the apparatuses described above is, is part of, or includes a camera or multiple cameras, a mobile device (e.g., a mobile telephone or so-called “smart phone” or other mobile device), a wearable device (e.g., a smartwatch, a fitness tracking device, etc.), an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, the apparatus further includes one or more displays for displaying one or more images, notifications, and/or other displayable data. In some aspects, the apparatus can include one or more sensors, which can be used for determining a location and/or pose of the apparatus, a state of the apparatus, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
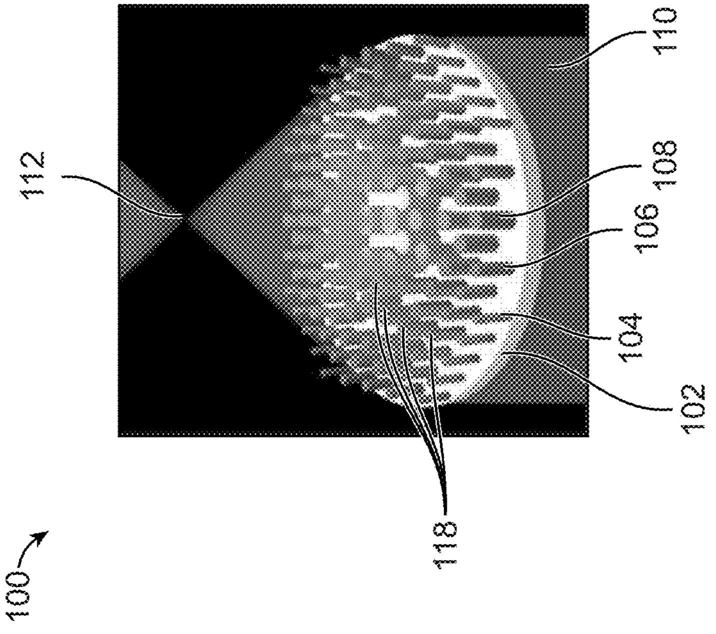
FIG. 1A is a perspective view of an example meta-lens, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Many devices and systems include optical elements, which can include lenses for focusing light onto an image sensor. In one example, a camera or a device including a camera (e.g., a mobile device, an extended reality (XR) device, etc.) with optical elements can capture a frame or a sequence of frames of a scene (e.g., a video of a scene). In order to achieve desirable optical characteristics (e.g., sharpness, wide field of view, etc.), the camera or camera device can utilize refractive lenses to focus incoming light on an image sensor. In some cases, a lens for a camera device can include compound lens comprising multiple refractive lens elements stacked together. In some cases, the overall thickness of the compound lens stack can add additional size to a device that includes the camera lens stack as part of a camera system.

In contrast to a refractive lens, a meta-lens is a lens made with meta-surface technology. A meta-surface is a flat optical component designed at the nanometer (nm) scale with small geometrical features on the surface. In some cases, the small geometrical features can control the transmission, polarization, and phase of light passing through the meta-lens. In one illustrative example, the small geometric features making up a meta-lens can include pillars or columns (sometimes referred to as nanopillars). In some cases, the effect on light passing through the pillars can depend on the geometry of the pillars such as the height of the pillars, diameter of the pillars, and pitch of the pillars. In some implementations, the pillars can have a constant height and the effect on light passing through the pillars can be varied by providing pillars with different diameters.

In some cases, meta-lenses can be fabricated in a piece-by-piece fashion using an electron beam (e-beam) lithography technique. In the e-beam lithography technique for fabricating meta-lenses, a focused e-beam can be scanned across a surface of a substrate to create a pattern corresponding to the desired meta-surface structure. In some cases, the surface of the substrate can be coated in a resist material that changes characteristics when exposed to e-beam energy. Depending on the type of resist material used, either the exposed resist material or the non-exposed resist material can be selectively removed while the other portion remains on the surface of the substrate. Where the resist material is selectively removed, the substrate can be exposed and can be etched (e.g., by wet etching, dry etching, reactive-ion etching (RIE), or the like) to remove a portion of the substrate material. In some cases, the etching process can create geometric features of the meta-surface on the surface of the substrate material to form a meta-lens.

For example, semiconductor manufacturing technology is used to produce multiple devices (e.g., microprocessors, application specific integrated circuits, or the like) simultaneously on a single silicon wafer. In contrast to the e-beam lithography technique described above, features fabricated on the surface of the silicon wafer are not individually drawn. Instead, the features (or a negative representation of the features) of a device can be patterned on to a mask. The features of a single device can be repeated in array to fill the area (or a portion of the area) of a surface of a silicon wafer with multiple devices. With a single exposure of light, the pattern on the mask can be transferred to a photosensitive resist (photoresist) material. In the case of semiconductor manufacturing, multiple masks may be used to fabricate different features of a device such as metal layers, transistors, passivation layers, mechanical structures or the like. Accordingly, it would be advantageous if the photolithography process used for manufacturing semiconductors could also be used to manufacture meta-lenses.

In some aspects, the silicon material used in many semiconductor manufacturing applications is transparent to certain wavelengths of light. In some cases, optical applications can detect light at the wavelengths of light where silicon is transparent. Accordingly, silicon can be a suitable substrate material for fabricating meta-lenses for image sensing applications where silicon is transparent to the wavelengths of light being detected. For example, silicon can be transparent for applications using short-wave infrared (SWIR) wavelengths. In some cases, SWIR sensitive image sensors can be fabricated using semiconductor fabrication techniques. For example, SWIR sensitive imagers can be fabricated on silicon wafers using Germanium-Silicon (GeSi) based complementary metal-oxide-semiconductor (CMOS) technology. In some cases, the semiconductor manufacturing technology described above can be used to fabricate meta-lenses on silicon wafers.

For some optical applications silicon may not be a suitable substrate for fabricating meta-lenses because the wavelengths of light relevant to the optical application may not be able to pass through the silicon. For example, silicon is opaque at visible light wavelengths. Many optical applications detect light at visible wavelengths. In such cases, a material that is transparent at visible light wavelengths can be a suitable substrate for fabricating meta-lenses. In one illustrative example, meta-lenses can be fabricated on a glass substrate. The semiconductor fabrication techniques described above are not currently available for use with a glass substrate. In some cases, fabrication techniques used with glass substrates may not be able to fabricate the nanoscale geometric features that make up meta-lenses. In some cases, nanoimprinting lithography technology can be used to fabricate meta-lenses on a glass substrate. In one illustrative example, the device layer can include a Titanium Dioxide (TiO2) material.

One potential disadvantage of a meta-lens based objective lens may be that the size of the meta-lens is limited by the size of the substrate upon which the meta-lens is disposed. In some cases, the cross-sectional area of the substrate of the meta-lens may interfere with other structures within a camera system. For example, an image sensor of a camera system may be connected to a printed circuit board (PCB) by one or more wire bonds. In some cases, attaching a meta-lens substrate directly to the image sensor could interfere with and/or prevent the use of such wire bonds.

Systems, apparatuses, processes (also referred to as methods), and computer-readable media (collectively referred to as "systems and techniques") are described herein for manufacturing meta-lenses and optical systems including meta-lenses. For example, the systems and techniques described herein include optical systems with tiered spacer structures. In some cases, the tiered spacer structures can allow for a meta-lens with sufficient cross-sectional area to provide a desired viewing angle. In some cases, the tiered space structure can provide a reduced cross-sectional area proximate to an image sensor of the optical system. In some cases, the tiered spacer structure can have a mushroom-shaped appearance.

In some cases, an image sensor of an optical system may include a microlens array disposed above an active region of the image sensor. In some aspects, a microlens array may improve the efficiency of an image sensor by directing incoming light toward photosensitive portions of individual pixels of the image sensor and away from portions of the individual pixels that are not sensitive to light (e.g., portions of the pixel covered in metal). In some implementations, a tiered spacer structure may be coupled to the microlens array by a transparent adhesive. In some cases, a transparent adhesive (e.g., an optically clear adhesive (OCA) may have an index of refraction similar to an index of refraction (e.g., a low refractive index) of the material used to create the microlens array. In some cases, such an arrangement of adhesive and microlenses having a similar index of refraction may render the microlenses ineffective. In some cases, a meta-lens microlens array can utilize a high index material (e.g., silicon) to produce desired refractive characteristics similar to a traditional microlens array. In some cases, a low refractive index adhesive (e.g., an OCA) may provide sufficient contrast to the refractive index of the meta-lens material (e.g., silicon) such that the meta-lens microlens array may provide the desired optical characteristics.

Figure 1B:
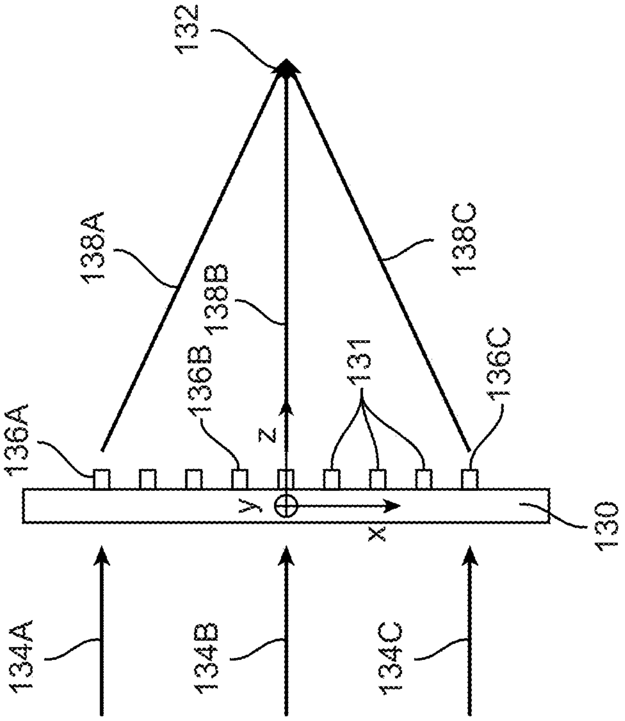
FIG. 1B is a lateral view of an example meta-lens, in accordance with some examples of the present disclosure.
Figure 1C:
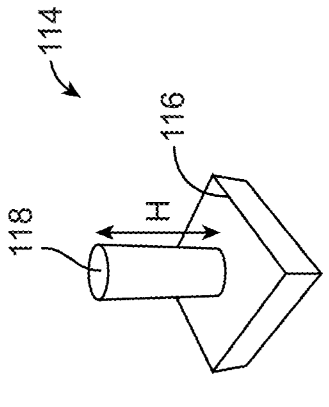
FIG. 1C is a perspective view of an example meta-lens unit cell, in accordance with some examples of the present disclosure.

Various aspects of the techniques described herein will be discussed below with respect to the figures. FIG. 1A through FIG. 1C illustrate views of an example meta-lens. In the illustrated example of FIG. 1A, a meta-lens 100 includes a substrate 102 (also referred to as a base) having multiple pillars 118 including pillars 104, 106, 108 disposed on the surface of the substrate 102. In some cases, the pillars 118 can be an example of nanoscale geometric structures forming a meta-surface. The pillars 104, 106, 108 can be nanostructures having a height on the nanometer scale. In some implementations, the height of the nanostructures (e.g., pillars 118) can be on the order of the wavelength of light relevant to a particular application. In one illustrative example, a pillar height between 1100 nanometer (nm) and 1200 nm can be used for a meta-lens in a SWIR application (e.g., for wavelengths between 1380 nm and 1550 nm). In another illustrative example, a pillar height between 300 nm and 400 nm can be used for a meta-lens in a visible light application (e.g., for wavelengths between 350 nm and 800 nm) In some implementations, the pillars 104, 106, and 108 can have a common height H. In the illustrated example of FIG. 1A, the pillars 104, 106, 108 can have different diameters, where the pillar 104 is shown with the smallest diameter, the pillar 106 is shown with a diameter larger than the pillar 104, and the pillar 108 is shown with a diameter larger than pillar 104 and pillar 106. In the illustration of FIG. 1A, additional pillars of different sizes disposed on the substrate 102 are also shown. FIG. 1A illustrates a column of light 110 incident upon the meta-lens 100. As will be explained in more detail below, the pillars of the meta-lens 100, including pillars 104, 106, 108 can shift the phase of the rays of the column of light 110 so that the rays of the incident column of light 110 converge to a focal point 112 with a common phase. In some cases, the column of light is collimated. In some cases, the distance between the meta-lens 100 and the focal point 112 can be referred to as the focal distance of the meta-lens 100. While the examples of this disclosure include example meta-lenses utilizing pillars 118 as the geometric features forming a meta-surface that forms the meta-lens, the systems and techniques described herein can be used with meta-lenses that include features other than pillars without departing from the scope of the present disclosure.

FIG. 1B illustrates a lateral view of an example meta-lens 130 that can be configured to focus light at a focal point 132. In some cases, the meta-lens 130 can include a plurality of pillars 131 (which can correspond to pillars 118 shown in FIG. 1A) on one surface of the meta-lens 130. The pillars 118 illustrated in FIG. 1B are shown for illustration are not shown to scale. In addition, the number, height, diameter, and/or pitch of the pillars 118 shown in FIG. 1B are only provided as an example. Other meta-lens configurations can be used without departing from the scope of the present disclosure. For example, each individual pillar of the pillars 118 shown in FIG. 1B could represent a group of pillars in a meta-lens. In the illustrated example of FIG. 1B, the pillars 136A, 136B, 136C can provide different phase delays to incoming light. For example, light passing through pillar 136B will experience a larger phase delay than pillar 136A or pillar 136C. In some cases, the pillars 136A, 136B, 136C can represent groups of pillars that provide different phases delays to incoming light. In the illustrated example of FIG. 1B, light rays 134A, 134B, 134C can be incident upon the meta-lens 130. In the illustrated example of FIG. 1B, light ray 134A passes through a first pillar 136A, light ray 134B passes through a second pillar 136B, and light ray 134C passes through a third pillar 136C. The light rays 138A, 138B, 138C represent the path of light rays 134A, 134B, 134C after passing through the respective pillars 136A, 136B, 136C. As illustrated in FIG. 1B, the rays 138A and 138C travel from edges of the meta-lens 130 and can travel a greater distance than the ray 138B to reach the focal point 132. In some implementations, each of the pillars 136A, 136B, 136C can be configured with a phase shift such that each of the rays 138A, 138B, 138C arrive at the focal point 132 with an identical phase. As will be explained with more detail below with respect to FIG. 1C through FIG. 1E, the phase shift experienced by light rays (e.g., 134A, 134B, 134C) passing through the pillars 136A, 136B, 136C can be controlled as a function of the geometry of the pillars 136A, 136B, 136C. In some cases, an amount of phase shift experienced by light passing through the pillar 118 can depend on the height H, the diameter D, the wavelength of the light, the angle of incidence, and the polarization of the light passing through the pillar.

Figure 1D:
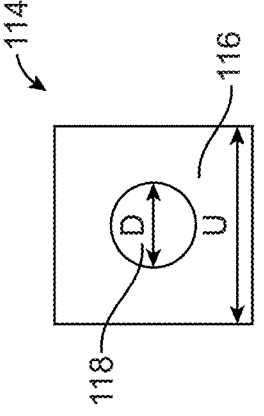
FIG. 1D is a top-down view of an example meta-lens unit cell, in accordance with some examples of the present disclosure.

FIG. 1C illustrates a perspective view and FIG. 1D illustrates a top-down view of a unit cell that can be used for designing a meta-lens (such as meta-lens 100) with desired optical characteristics. In the illustration of FIG. 1C and FIG. 1D, the unit cell 114 can include a base 116, which can be a portion of the substrate 102 of the meta-lens 100 shown in FIG. 1A. In some cases, the base 116 includes a pillar 118 disposed upon the base 116 and centered at the center of the unit cell 114. In some aspects, the unit cell can be a square with a width of U. In some implementations, the width U of the unit cell can be determined based on the wavelength (λ) of light that the meta-lens is designed for. In some cases, the width U can be less than λ/2*NA where NA is the numerical aperture of the meta-lens. In some cases, the width U of a unit cell can be between 300 nm and 600 nm. The pillar 118 can have a height of H and a diameter of D. In some cases, the optical characteristics of each unit cell 114 can be configured based on the value selected for the value D of each unit cell. In some cases, a meta-lens can be constructed by arranging an array (also referred to as a lattice) of unit cells having pillars 118 of different diameters to achieve desired optical characteristics. In the case where each of the unit cells has an identical value of U, the pillars 118 can have a uniform pitch. Although a square unit cell and associated lattice are described herein with respect to FIG. 1C and FIG. 1D, other unit cell shapes and lattice structures can be utilized without departing from the scope of the present disclosure. In one illustrative example, a hexagonal unit cell can be used to form a hexagonal or triangle lattice.

Figure 1E:
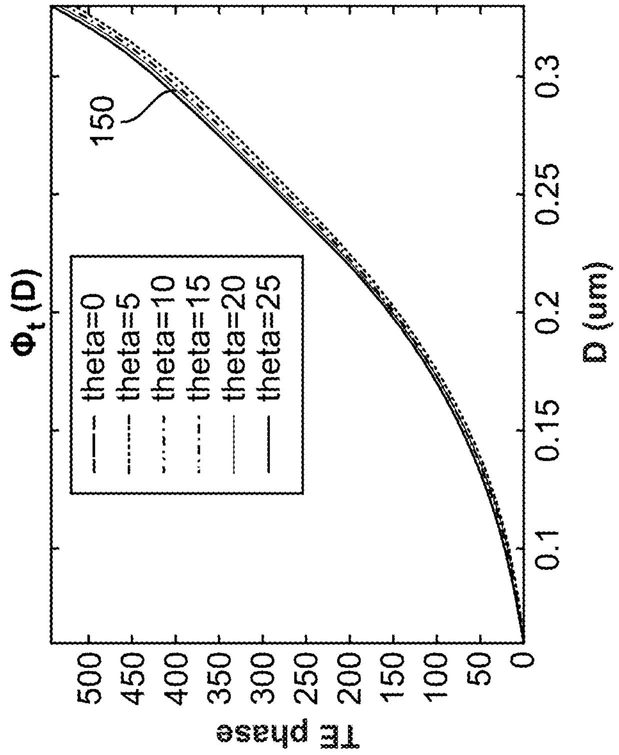
FIG. 1E illustrates a plot of pillar diameter against phase, in accordance with some examples of the present disclosure.

FIG. 1E illustrates multiple plots 150 of phase shift for light traveling through pillars of different diameters D. The illustrative example of FIG. 1E depicts the relationship between diameter and phase for transverse electric (TE) polarized light passing through the pillar 118. In the illustrated example of FIG. 1E, the horizontal axis represents diameter D in microns (μm) of a pillar 118 in a unit cell 114 and the vertical axis represents the amount of phase shift experienced by light that has passed through the pillar 118. The multiple plots 150 illustrate the amount of phase shift experienced by light for different angles of incidence theta. As shown in FIG. 1E, for a fixed pillar height H, the phase shift for light passing through the pillar 118 can increase as the diameter D of the pillar 118 increases.

Figure 2B:
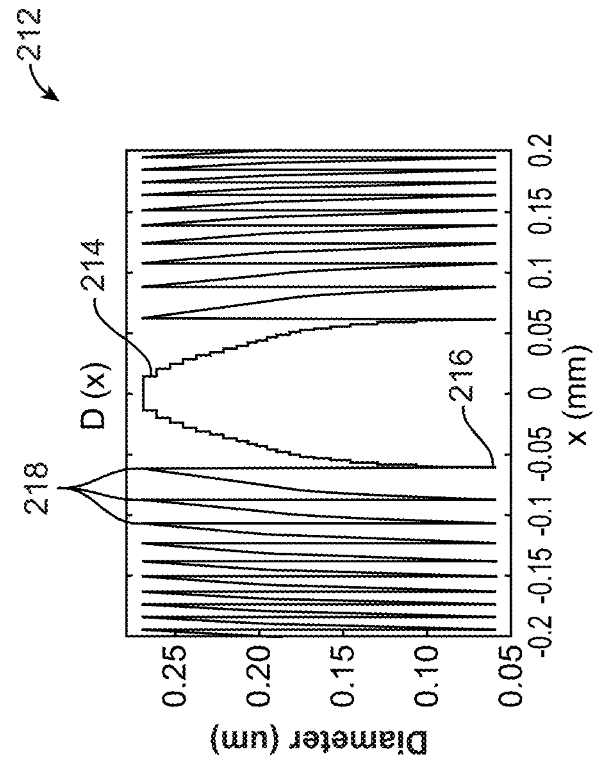
FIG. 2B illustrates a plot of pillar position against diameter, in accordance with some examples of the present disclosure.
Figure 2A:
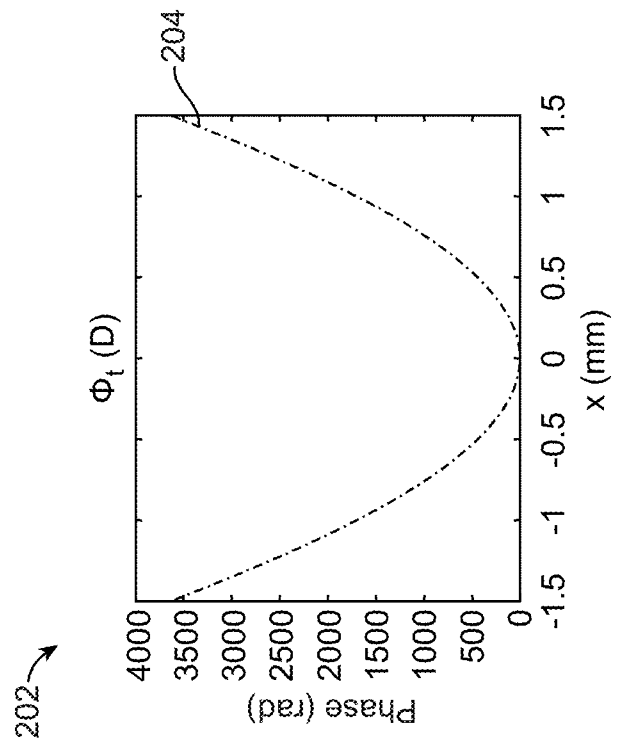
FIG. 2A illustrates a plot of pillar position against phase, in accordance with some examples of the present disclosure.

FIG. 2A illustrates a plot 202 of an example relationship between distance from the center of a meta-lens (e.g., meta-lens 100 shown in FIG. 1A) and an amount of phase shift for two example positive meta-lenses. In the illustrated examples of FIG. 2A and FIG. 2B, the meta-lens can be formed with an array unit cells (e.g., unit cell 114 shown in FIG. 1C and FIG. 1D above) having fixed height and width U and pillars of uniform height. In one illustrative example, the relationship between diameter D of the pillars included in the unit cells corresponds to the plots 150 shown in FIG. 1E above. In the illustrated example of FIG. 2A, the horizontal axis represents a distance from the center of the meta-lens and the vertical axis represents a phase shift to be imparted by at each distance to achieve particular desired meta-lens optical characteristics. The example plot 204 illustrates an example of an optimized meta-lens having a desired set of optical characteristics. In some cases, optimized characteristics for a meta-lens can be determined using an optical ray-tracing software. For example, the example plot 204 can represent a lens optimized to minimize an optical path difference (OPD) over a range of angles of incidence between 0 and 25 degrees. In one illustrative example, the lens represented by example plot 204 can be the result of an optimization of Equation (1) below:

$$OPD(r) = \sqrt{r^2 + f^2} - f + \sum_{m=1}^{6} a_m (r)^{2m} \tag{1}$$

Where r is the radius of the meta-lens, f, is the focal length of the meta-lens, and $a_m$ are coefficients that are adjusted to determine the optimized OPD. As will be illustrated with respect to FIG. 2C below, optimizing the OPD can improve focusing for ray angles that are not normally incident to the meta-lens.

As described with respect to FIG. 1A through FIG. 1E above, an example meta-lens can be configured such that any incident ray passing through pillars (e.g., pillars 118) of the meta-lens can arrive at a focal point with an identical phase. In the illustration of FIG. 2A, the horizontal axis of the plot 202 represents a distance in millimeter (mm) from the center of the meta-lens and the vertical axis of the plot 202 represents an amount of phase shift in radians required to achieve the desired optical characteristics for the example meta-lens.

FIG. 2B illustrates a plot 212 of meta-lens pillar diameter plotted against distance from the center of a meta-lens. In the illustrated example of FIG. 2B, the horizontal axis represents a distance from the center of the meta-lens and the vertical axis represents a diameter of a pillar to achieve particular meta-lens optical characteristics. The example pillar diameters shown in FIG. 2B correspond to the plot 202 of the optimized meta-lens described above with respect to FIG. 2A. Because the propagation of light can be described as a sinusoid, the phase of the light can repeat every period of the wavelength of the light (e.g., every 360 degrees or every 2×pi(π) radians). As a result, the same pillar diameter can be used when, for example, the desired phase shift is 180 degrees as well as when the desired phase shift is 540 degrees. Accordingly, the plot 212 illustrates a range of pillar diameters that can provide phase shifts that correspond to the example plot 204 of an optimized meta-lens. In the illustrated example, the diameter D can have a maximum value at the center 214 of the meta-lens. In some cases, as the distance from the center 214 of the meta-lens increases, the diameter D of the pillars in the unit cells can decrease until a minimum diameter 216 is reached. At the distance from the center 214 of the meta-lens corresponding to the minimum diameter 216, the desired phase shift for the pillars can be 2 π radians separated from than the desired phase shift for the pillars at the center 214 of the meta-lens. In some cases, at each point where the desired phase shift is a multiple of 2 π radians separated from the phase shift from the pillars at the center 214 of the meta-lens, the diameter D of the pillars can be reset to the largest size. In some cases, the locations where the pillar diameter D resets to the largest value can be referred to as phase reset points 218.

Figure 2C:
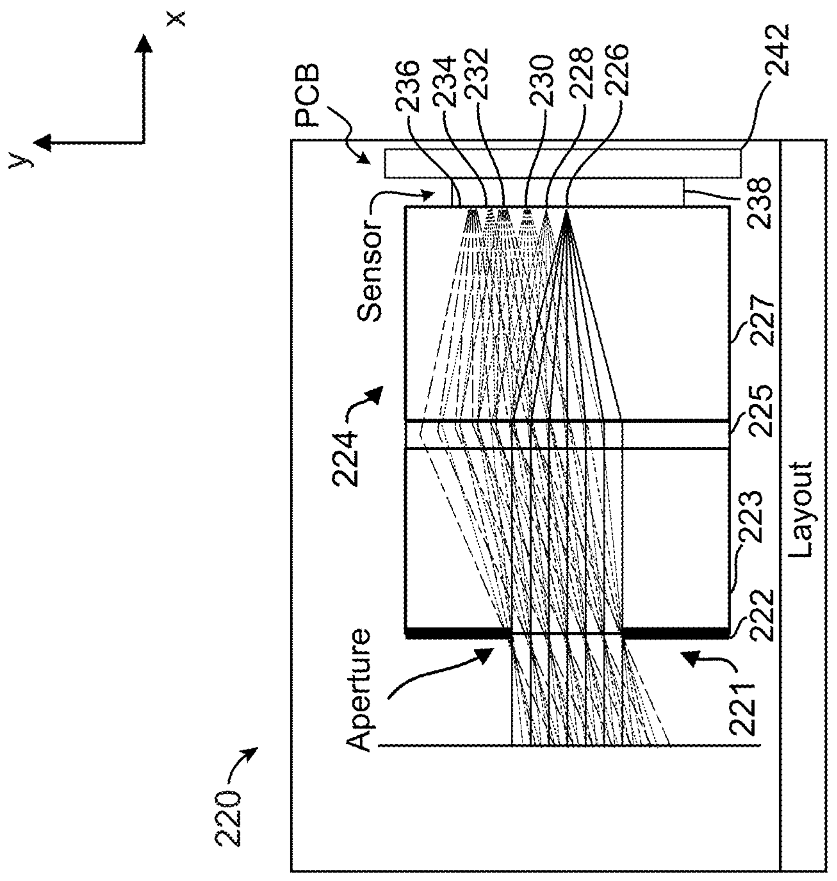
FIG. 2C illustrates an example ray diagram for a meta-lens, in accordance with some examples of the present disclosure.
Figures 2D, 2E:
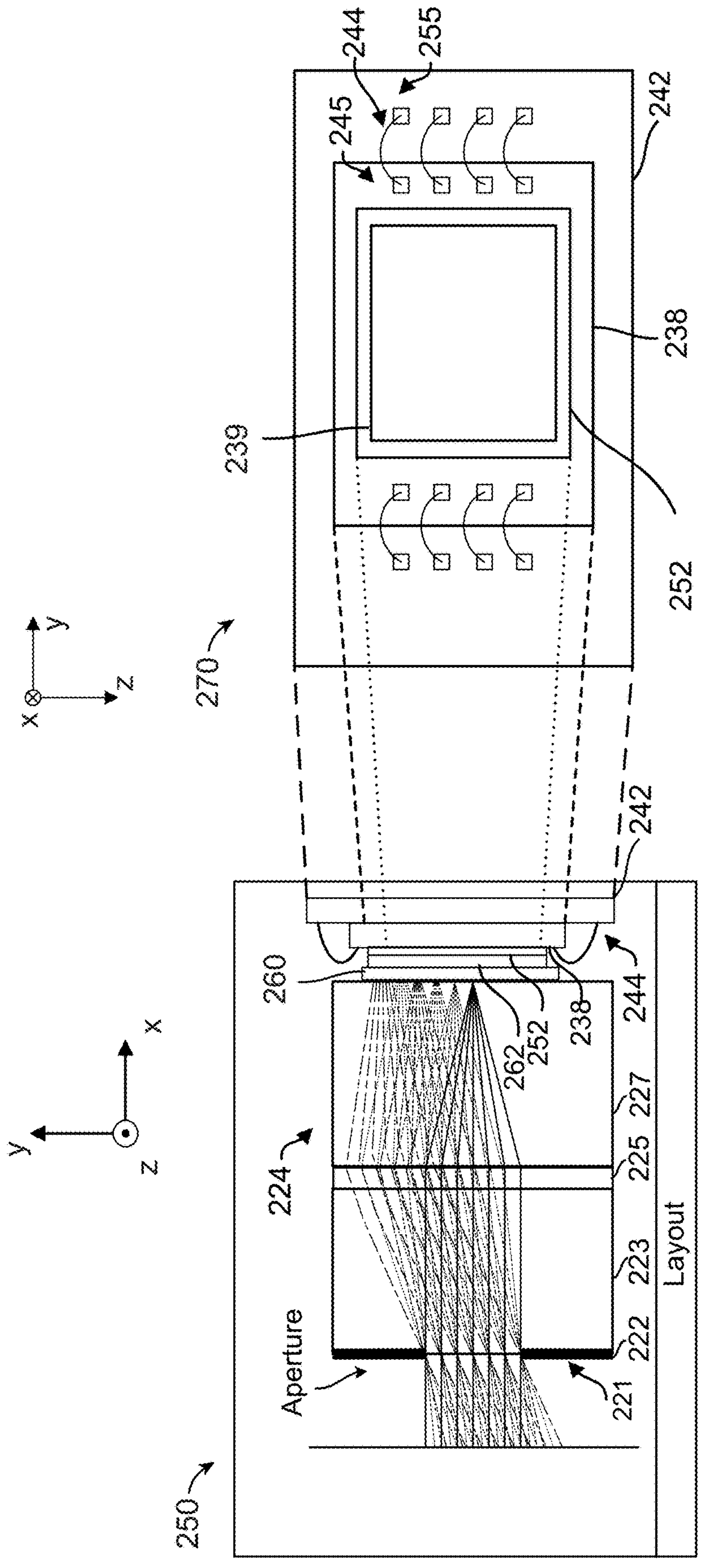
FIG. 2D illustrates an example meta-lens stackup with a tiered spacer structure shown from a cross-sectional view, in accordance with some examples of the present disclosure.
FIG. 2E illustrates the example meta-lens stackup of FIG. 2D with the tiered spacer structure shown from a bird's eye view, in accordance with some examples of the present disclosure.

FIG. 2C illustrates an example ray diagram 220 for an optimized meta-lens configuration. In the illustrated example, the lens configuration can be optimized for wide-angle performance. In one illustrative example, the meta-lens assembly 224 shown in the ray diagram 220 can correspond to the example meta-lens phase characteristics shown in example plot 204 shown in FIG. 2A above. FIG. 2D illustrates an aperture assembly 221, a meta-lens assembly 224, and light rays 226, 228, 230, 232, 234, 236. In the illustrated example of FIG. 2C, light rays 226 can have an angle of incidence of 0 degrees, light rays 228 can have an angle of incidence of 5 degrees, light rays 230 can have an angle of incidence of 10 degrees, light rays 232 can have an angle of incidence of 15 degrees, light rays 234 can have an angle of incidence of 20 degrees, and light rays 236 can have an angle of incidence of 25 degrees. As shown in FIG. 2C, the light rays 226, 228, 230, 232, 234, 236 show a reduced amount of spread at the focal plane (e.g., at an image sensor 238) when compared to the light rays 226, 228, 230, 232, 234, 236 shown in FIG. 2C.

In the example of FIG. 2C, the aperture assembly 221 includes the aperture 222 disposed on a substrate 223. In some cases, a thickness of the substrate 223 (e.g., along the x-axis direction) can correspond to a distance between the aperture 222 and the meta-lens 225.

As illustrated in FIG. 2C, the meta-lens assembly 224 can include a meta-lens 225 and a substrate 227. In some cases, the meta-lens 225 of the meta-lens assembly 224 can be coupled to the substrate 223 of the aperture assembly 221. In some examples, the meta-lens 225 may be coupled to the substrate 223 by a transparent adhesive (e.g., an optically clear adhesive (OCA)). In some cases, an index of refraction of the transparent adhesive may be selected to ensure contrast between pillars of the meta-lens 225 and the transparent adhesive. In one illustrative example, the meta-lens 225 may be fabricated on silicon. In some cases, a transparent adhesive with a low index of refraction may provide sufficient contrast to avoid interfering with the refractive characteristics of the meta-lens 225. In some cases, the substrate 223 can exhibit transparency at a wavelength corresponding to a photosensitive light spectrum of the image sensor 238. For example, the image sensor 238 may be configured to sense light in SWIR wavelengths. In such an example, a material for the substrate 223 that is transparent at SWIR wavelengths may include glass, plastic, silicon, or the like. In another illustrative example, the image sensor 238 may be configured to sense light in the visible wavelengths. In some cases, a material for the substrate 223 that is transparent at visible wavelengths may include plastic, glass, or the like.

In the illustrated example of FIG. 2C, the substrate 227 of the meta-lens assembly 224 can be coupled to the image sensor 238 by an OCA. In some cases, the substrate 227 can exhibit transparency at a wavelength corresponding to a photosensitive light spectrum of the image sensor 238 as described above with respect to substrate 223. In some cases, a thickness of the substrate 227 can correspond to a focal length (e.g., back focal length) of the meta-lens 225.

In one illustrative example, the example meta-lens 225 of FIG. 2C can represent a meta-lens configured as follows: the meta-lens 225 can be designed for a wavelength of 1380 nm or 1550 nm; the aperture 222 can have a 1 mm diameter; a spacing between the apertures 222 and the meta-lens 225 can be 1.5 mm; the meta-lens 225 can be fabricated on a 0.5 mm thick crystalline silicon wafer substrate; and the meta-lens 225 can have a focal length of 2 mm.

FIG. 2D illustrates an example meta-lens stackup with a tiered spacer structure shown from a cross-sectional view 250. In the example of FIG. 2D, the cross-sectional view 250 includes an aperture assembly 221, a meta-lens assembly 224, and an image sensor 238 that can be similar to and perform similar functions to like numbered components of FIG. 2C. As illustrated in the cross-sectional view 250 of FIG. 2D, the meta-lens stackup can further include, without limitation, a first tiered spacer 260, a second tiered spacer 262, a microlens array 252, and a printed circuit board (PCB) 242.

As illustrated in FIG. 2D, in some cases, the substrate 227, first tiered spacer 260 and/or second tiered spacer 262 can be configured to provide spacing between the meta-lens 225 and the image sensor 238 that corresponds to a focal length (e.g., the back focal length) of the meta-lens 225. In some implementations, wire bonds 244 may be utilized to provide a connection between bond pads on the image sensor 238 (e.g., bond pads 245 of FIG. 2E) and bond pads on the PCB 242 (e.g., bond pads 255 of FIG. 2E). As illustrated in FIG. 2D, by providing the first tiered spacer 260 and/or the second tiered spacer 262 with a cross-section (e.g., in the y-z plane) that is less than a cross-sectional area of the aperture assembly 221 and/or meta-lens assembly 224, the wire bonds 244 can remain intact when the spacer structure is coupled to the image sensor 238. As used herein, spacer structure refers to one or more spacers (e.g., substrate 227, first tiered spacer 260, and/or second tiered spacer 262) where at least one edge of a cross-section of the spacer structure proximate to the image sensor 238 overlaps with a cross-section of a peripheral region (e.g., a region outside of an active region) of the image sensor 238.

In some cases, providing a tiered spacer structure between the meta-lens 225 and the image sensor 238 can allow the meta-lens 225 to refract light from a wide viewing angle by providing a meta-lens 225 with a large area disposed on the substrate 227. However, as illustrated by the light rays refracted by the meta-lens 225 (e.g., light rays 226, 228, 230, 232, 234, 236 of FIG. 2C), the cross-sectional area of the spacer structure can be reduced proximate to the image sensor 238 without significantly impacting the viewing angle of the camera system. Accordingly, utilizing the tiered spacer structure shown in FIG. 2D can allow for accommodation of wire bonds 244 while maintaining similar image characteristics to a spacer structure with uniform cross-sectional area.

FIG. 2E illustrates a portion of the example meta-lens stackup of FIG. 2D with a tiered spacer structure shown from a bird's eye view 270. For the purposes of illustration, correspondence between the PCB 242 in FIG. 2D and FIG. 2E is illustrated by a dashed line. Similarly, correspondence between the image sensor 238 in FIG. 2D and FIG. 2E is illustrated by a short-dashed line. In addition, correspondence between the microlens array 252 in FIG. 2D and FIG. 2E is illustrated by a dotted line. In some cases, as illustrated by FIG. 2E, wire bonds 244 can form a connection between bond pads 245 of the image sensor 238 and bond pads 255 of the PCB 242. In some cases, the image sensor 238 can include an active region 239 (also referred to herein as a detector array). In some examples, the active region 239 can include photosensitive elements that can detect light with a particular wavelength or range of wavelengths (e.g., visible, SWIR, etc.). As used herein, a peripheral region of the image sensor 238 refers to the region outside of the active region 239. In some aspects, the peripheral region of the image sensor 238 may include various circuitry, bond pads 245, or the like.

In some implementations, a microlens array 252 may be coupled to the image sensor 238. In some cases, the microlens array 252 may overlap with the active region 239. In some examples, the microlens array 252 may extend beyond the periphery of the active region 239 to partially overlap the peripheral region. In some cases, the microlens array 252 may include an array of microlenses, where each microlens can correspond to a pixel of the image sensor 238 (e.g., a pixel of the active region 239). In some examples, a portion of each pixel may be covered by metal and/or otherwise lack sensitivity to light. In some cases, the individual microlenses of the microlens array 252 may be configured to focus light on photosensitive portions of each pixel.

Figure 6A:
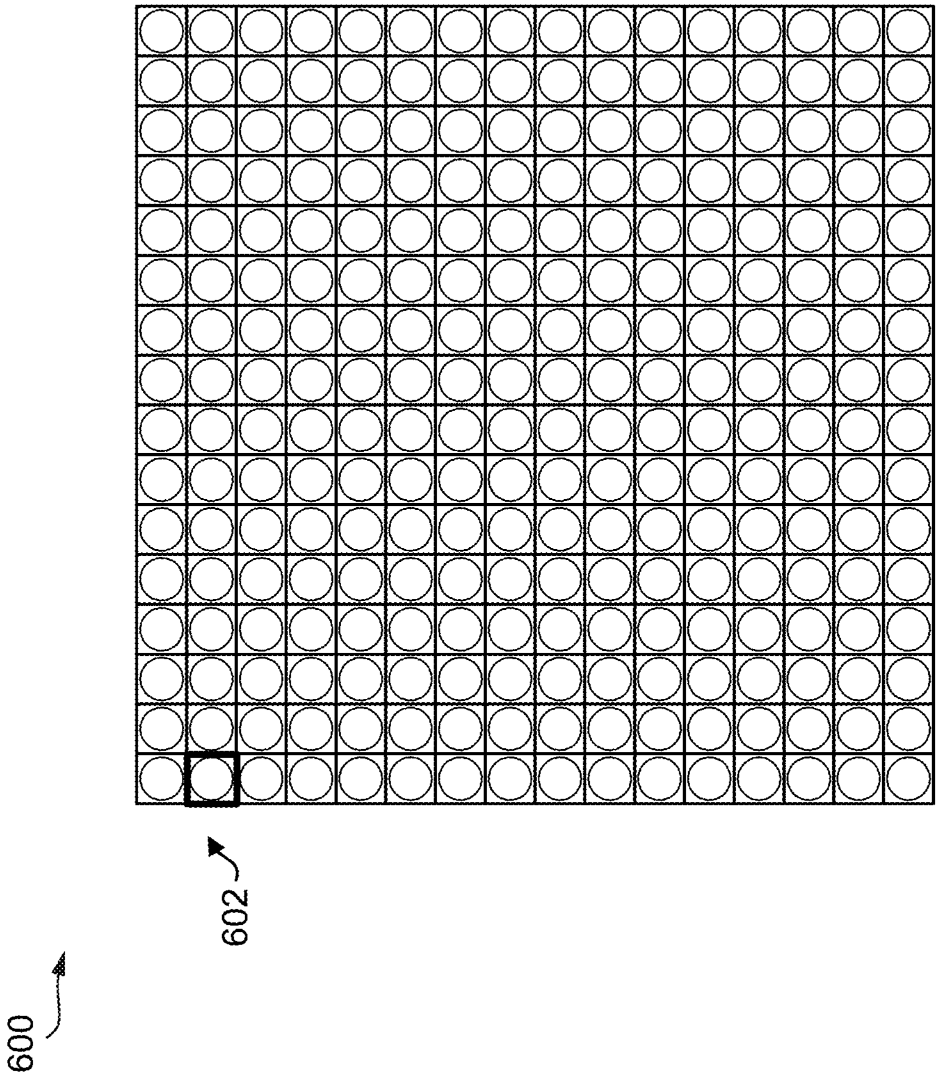
FIG. 6A is a diagram illustrating a microlens array, in accordance with some examples of the present disclosure.

FIG. 6A illustrates an example microlens array 600. In some cases, the microlens array 252 of FIG. 2E can correspond to the microlens array 600 of FIG. 6A. In some cases, an individual microlens 602 (e.g., a refractive lens element) can correspond to an underlying pixel of an image sensor (e.g., image sensor 238 of FIG. 2E). In some cases, the microlens array 600 can be fabricated directly on the surface of an image sensor during a silicon fabrication process that may also be used to fabricate the image sensor. In some cases, the microlens array 600 can be fabricated using a material with a low index of refraction. In some examples, the microlens array 600 may be attached to a surface of the image sensor using a transparent adhesive.

Returning to FIG. 2E, in some implementations, the second tiered spacer 262 may be coupled to the microlens array using a transparent adhesive. In some cases, a transparent adhesive may have a low index of refraction similar to the material used in the microlens array 252. In some examples, if the microlenses of the microlens array 252 have a similar index of refraction to the adhesive, the microlenses may no longer function to direct light toward the active region 239 of the image sensor 238. However, in some cases, a meta-lens microlens array may function properly in the presence of a transparent adhesive with a low index of refraction.

Figure 6B:
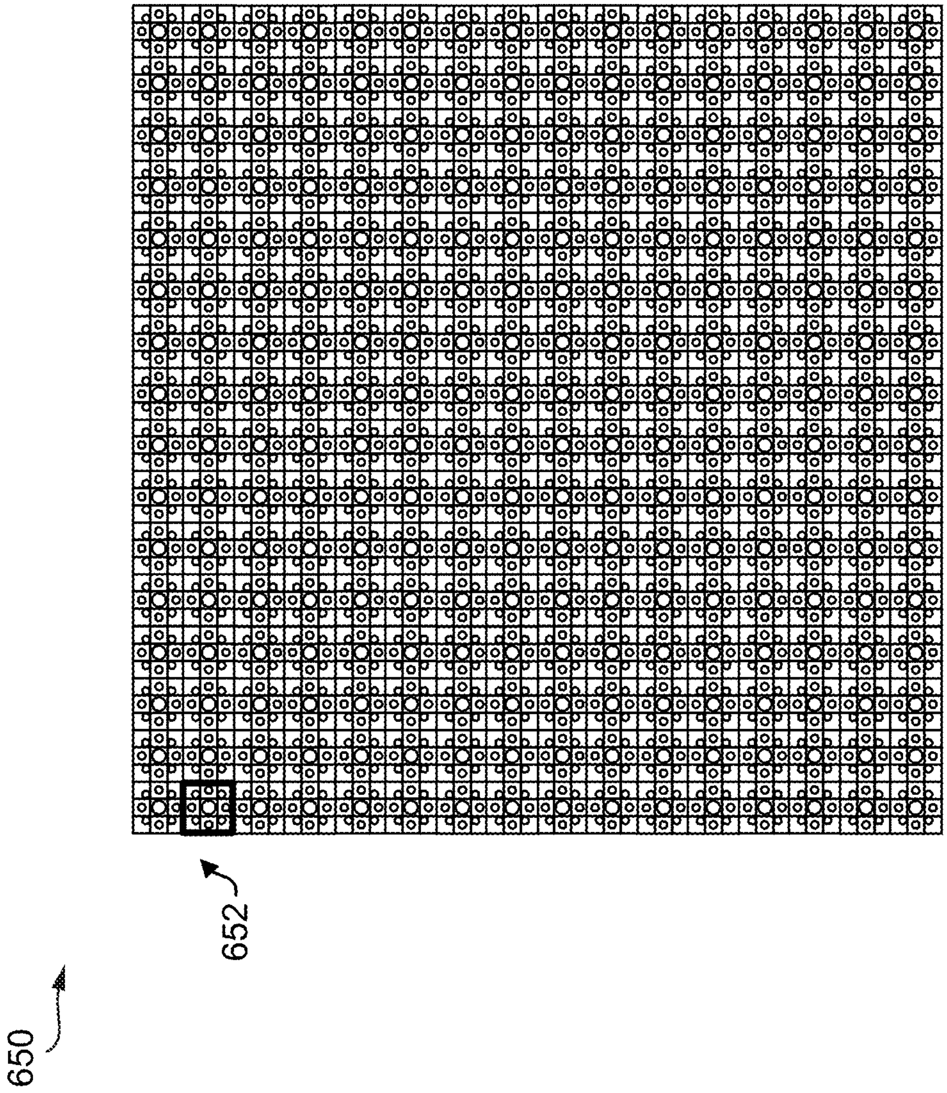
FIG. 6B is a diagram illustrating a meta-lens microlens array, in accordance with some examples of the present disclosure.

FIG. 6B illustrates an example meta-lens microlens array 650. As noted above, in some cases, a meta-lens can be fabricated in silicon using standard fabrication processes. In some cases, a transparent adhesive with a low refractive index may provide sufficient contrast to pillars included in a silicon-based meta-lens microlens such that the meta-lens microlens may function properly. In some cases, meta-lenses can produce the optical characteristics of an individual microlens of a traditional microlens array (e.g., microlens array 600 of FIG. 6A). For example, an individual meta-lens microlens 652 may include multiple unit cells (e.g., unit cell 114 of FIG. 1C) as shown in FIG. 7A and/or FIG. 7B.

Figure 7B:
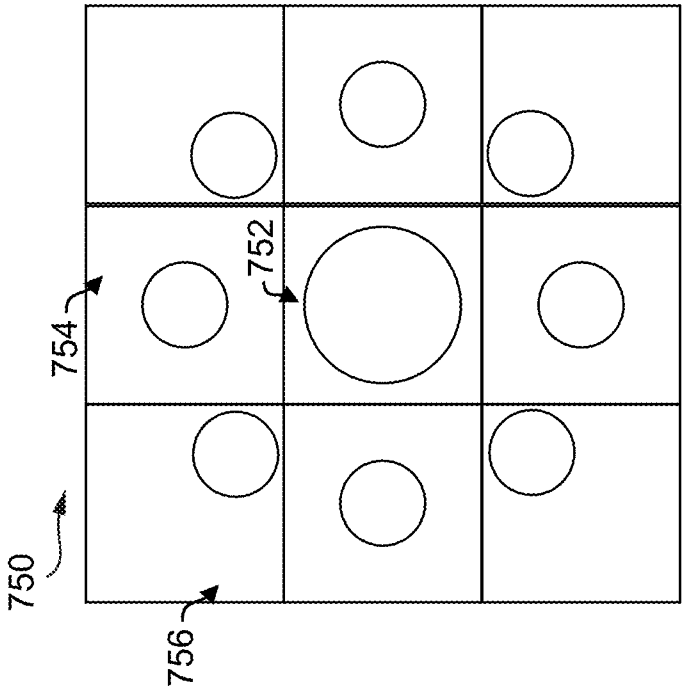
FIG. 7B is a diagram illustrating an additional example configuration of a meta-lens microlens, in accordance with some examples of the present disclosure.
Figure 7A:
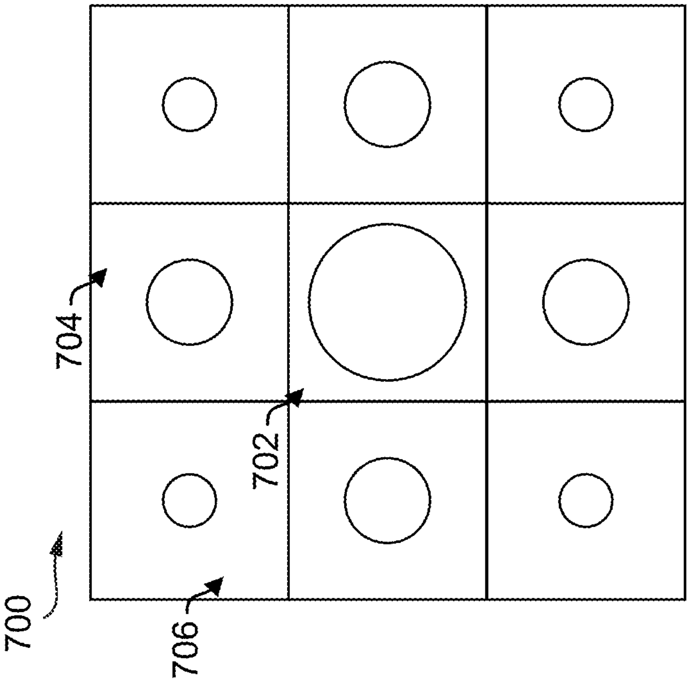
FIG. 7A is a diagram illustrating an example configuration of a meta-lens microlens, in accordance with some examples of the present disclosure.

FIG. 7A and FIG. 7B provide example configurations for meta-lens microlenses. FIG. 7A illustrates an example meta-lens microlens 700 that includes a three row by three column (3×3) array of unit cells (e.g., unit cell 114 of FIG. 1C). In the example meta-lens microlens 700 of FIG. 7A, the meta-lens microlens includes a central unit cell 702, edge unit cells 704, and corner unit cells 706. In the example of FIG. 7A, each of the central unit cell 702, edge unit cells 704, and corner unit cells 706 includes pillars that are centered within the individual unit cells. In some implementations, the central pillar included in central unit cell 702 may have the largest diameter, the central pillars included in the edge unit cells 704 may have a smaller diameter than the pillar of the central unit cell 702, and the central pillars included in the corner unit cells 706 may have the smallest diameter to provide a desired optical characteristic similar to individual microlens 602 of FIG. 6A.

FIG. 7B illustrates an additional example meta-lens microlens 750. In the additional example meta-lens microlens 750 of FIG. 7B, the meta-lens microlens includes a central unit cell 752, edge unit cells 754, and corner unit cells 756. Similar to the central unit cell 702 of FIG. 7A, the central unit cell 752 of the additional example meta-lens microlens 750 has the largest diameter. However, unlike the edge unit cells 704 and corner unit cells 706 of example meta-lens microlens 700 of FIG. 7A, the edge unit cells 754 and corner unit cells 756 of FIG. 7B include pillars having nominally identical diameters. In some cases, the pillars included in edge unit cells 754 and/or corner unit cells 756 may be offset from the center of their respective unit cells to produce the desired optical characteristics.

While the example meta-lens microlens 700 of FIG. 7A and the additional example meta-lens microlens 750 of FIG. 7B are shown as three row by three column (e.g., 3×3) arrays of unit cells with cylindrical pillars, it should be understood that other meta-lens microlens configurations can be used without departing from the scope of the present disclosure. For example, in some cases, a meta-lens microlens may include a rectangular array of unit cells with more (e.g., four or more) or fewer (e.g., one or two) rows and/or columns. In addition, in some examples, the shape of the pillars included in unit cells of a meta-lens microlens may differ from the cylindrical pillars with circular cross section shown in FIG. 7A and FIG. 7B. For example, the pillars included in unit cells of a meta-lens microlens may have a rectangular cross-section without departing from the scope of the present disclosure. In addition, unit cells including centered pillars, offset pillars, and/or any combination thereof can be utilized without departing from the scope of the present disclosure.

Figure 3:
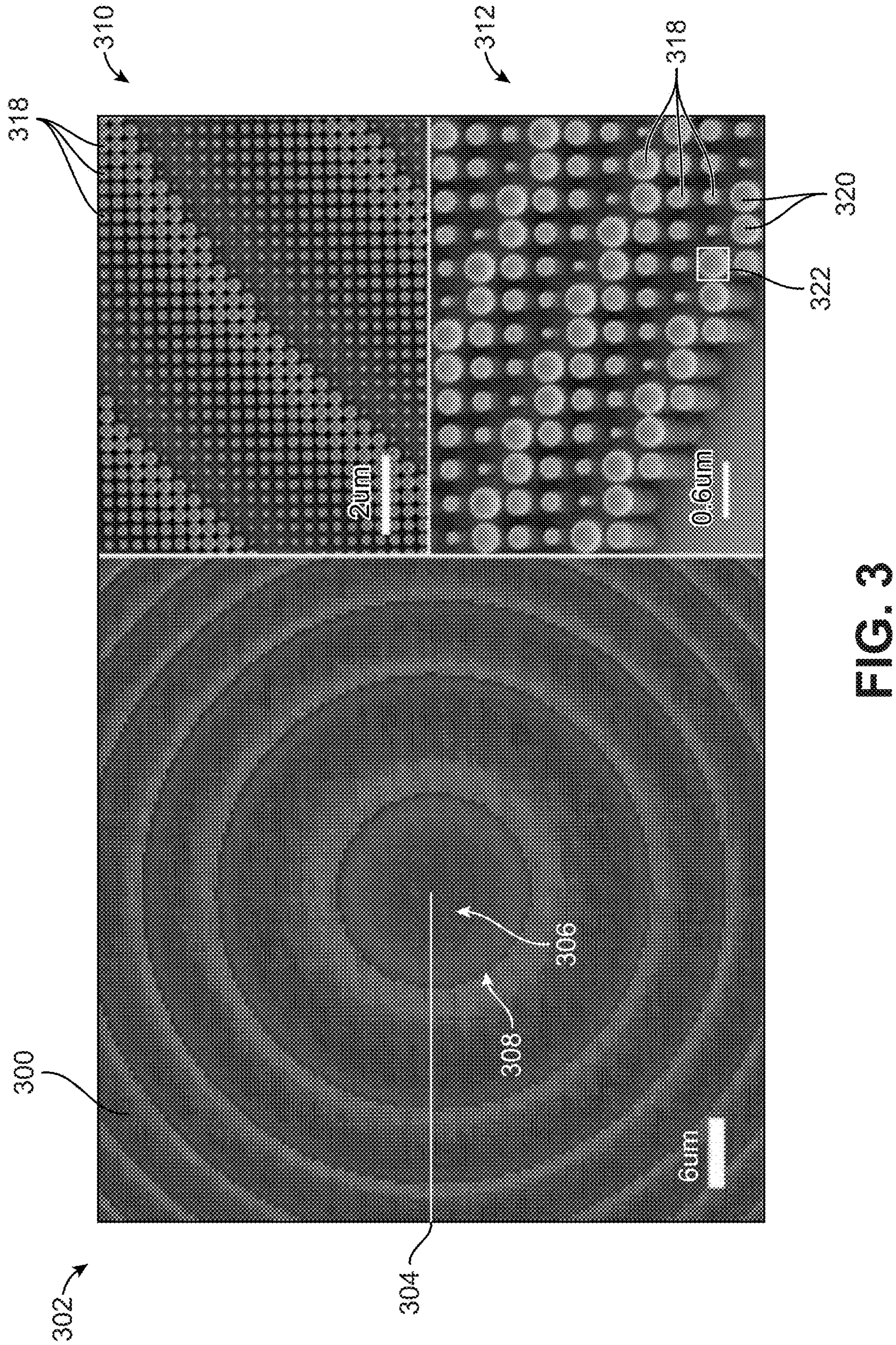
FIG. 3 is a diagram illustrating example magnified portions of a meta-lens, in accordance with some examples of the present disclosure.

FIG. 3 illustrates example magnified portions of a meta-lens 300 illustrating a pattern of unit cells with varying pillar diameters. In one illustrative example, the pillar sizes of meta-lens 300 can correspond to the example meta-lens illustrated in plot 212 shown in FIG. 2B. As illustrated in FIG. 3, a low magnification level view 302 of the meta-lens 300 shows that the pattern of pillars 318 (which can correspond to pillars 118 shown in FIG. 1C and FIG. 1D above) of the meta-lens 300 can have a radially symmetric pattern extending from the center of the meta-lens 300 to the periphery of the meta-lens 300. In the illustration of FIG. 3, a line segment 304 extending radially from the center 306 of the meta-lens 300 is drawn. As shown in the plot 212 of FIG. 2B, near the center 306 of the meta-lens 300, the diameter of the pillars 318 can have a maximum value. In one illustrative example, the diameter of the pillars 318 at the center of the meta-lens 300 can be approximately equal to or slightly smaller than the width U of a unit cell (e.g., unit cell 114 as shown in FIG. 1C and FIG. 1D). Moving away from the center 306 of the meta-lens 300, the pillar size can decrease (providing a correspondingly smaller phase shift) relative to the pillars at the center 306 of the meta-lens until a phase reset point 308 (e.g., phase reset points 218 shown in FIG. 2B) is reached. At the phase reset point 308, the size of the pillars 318 can be reset to the largest diameter. In some cases, the varying diameters of the pillars 318 can create a ring-like appearance. The medium magnification level 310 and high magnification level 312 further illustrate the appearance of the pillars within the unit cells. As illustrated, the pillars 318 can be centered on a common pitch and large pillars 320 can have a diameter slightly smaller than the width U of a unit cell 322 (depicted as a white square).

Figure 4:
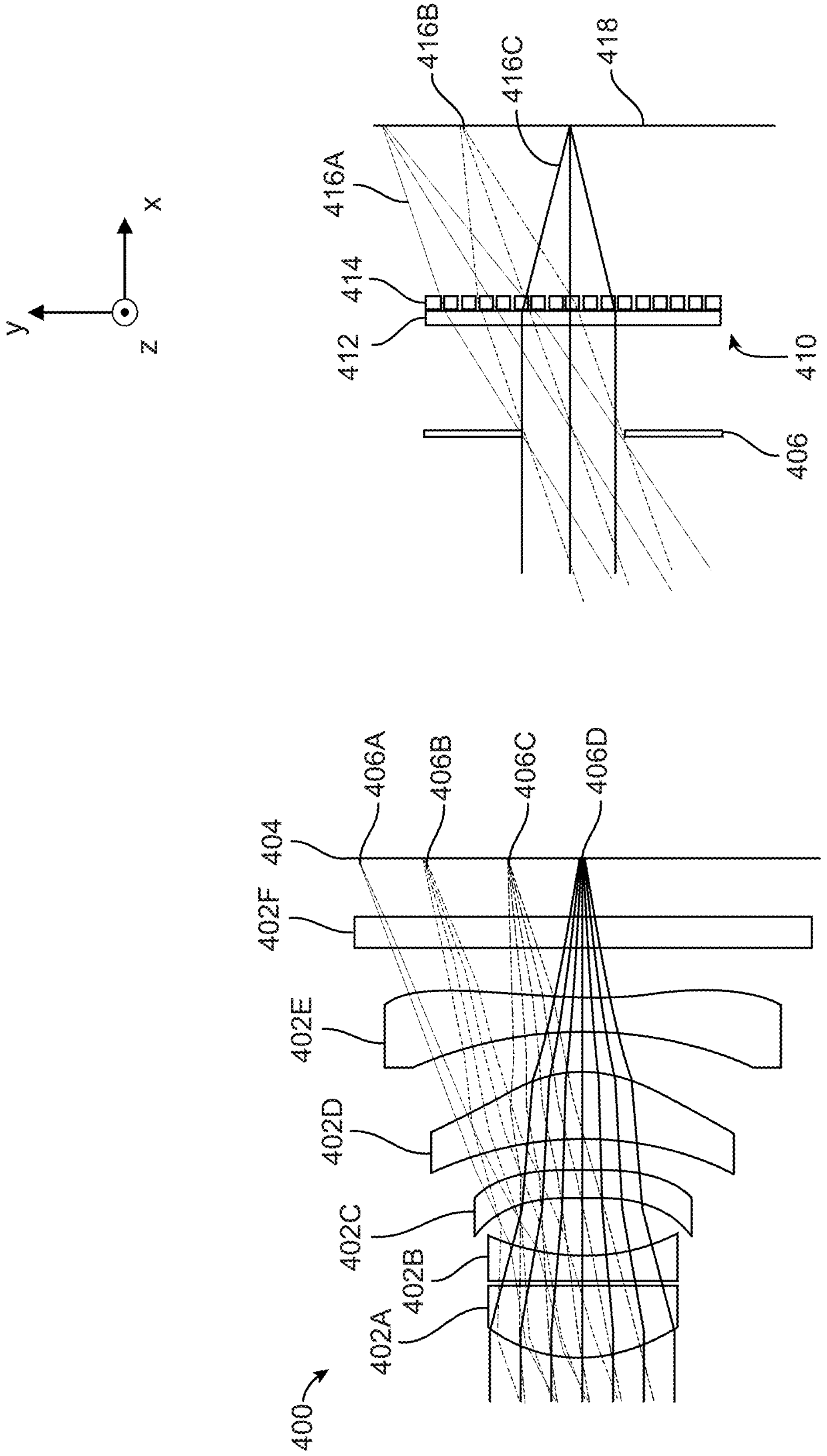
FIG. 4 are diagrams illustrating lateral views of a compound lens and a corresponding meta-lens, in accordance with some examples of the present disclosure.

FIG. 4 illustrates lateral views of a compound lens 400 and a corresponding meta-lens 410 that can have similar optical characteristics. In the illustration of FIG. 4, the compound lens 400 includes lens elements 402A, 402B, 402C, 402D, 402E, and a sensor cover glass 402F that when stacked together can provide desired optical characteristics for a particular application. For example, the compound lens 400 can be designed with a particular target focal range, a wide-angle field of view, and desired upper limit amounts of spherical aberration and chromatic aberration, among other characteristics. In the compound lens 400, the various optical elements 402A, 402B, 402C, 402D, 402E, 402F can each refract incoming light rays 406A, 406B, 406C, 406D in different ways such that the overall effect of the optical elements 402A, 402B, 402C, 402D, 402E, 402F, when stacked together, provides the desired optical performance. In the illustrated example, the compound lens 400 can operate to focus the incoming light rays 406A, 406B, 406D, 406D at the focal plane 404. In some examples, an optical sensor (also referred to as an image sensor, image detector, or light sensitive device herein) can be positioned at the focal plane 404 to detect the incoming light. Because multiple elements can be required to achieve the desired characteristics of the compound lens 400, the compound lens can add significant height, weight, and/or cost to a device using the compound lens 400 (e.g., a mobile device). In some cases, a device may have more than one camera as well as other optical sensors, each of which may require multiple separate compound lenses.

In some cases, a meta-lens 410 can be configured to perform with similar optical characteristics to the compound lens 400. In some implementations, a single layer meta-lens 410 can provide the desired optical characteristics for an imaging system (e.g., a camera, a range imager, or the like). In such cases, the meta-lens 410 can provide substantial savings in weight and thickness relative to the compound lens 400. The meta-lens 410 can include a substrate 412 and pillars 414 (e.g., pillars 118 shown in FIG. 1A, FIG. 1C and FIG. 1D). In some cases, light rays 416A, 416B, and 416C can arrive at the meta-lens 410 from different angles after passing through an aperture 406. As illustrated in FIG. 4, the meta-lens 410 can focus the light at a focal plane 418. In some examples, an optical sensor can be positioned at the focal plane 418 to detect the incoming light. In some cases, meta-lens 410 structures can be fabricated with an electron beam (e-beam) lithography technique. In some aspects, e-beam lithography can be a costly and time consuming process because e-beam lithography individually draws the desired structure for each meta-lens. Accordingly, the fabricating meta-lenses in large quantities using e-beam lithography can become prohibitively expensive and time consuming.

Figure 5:
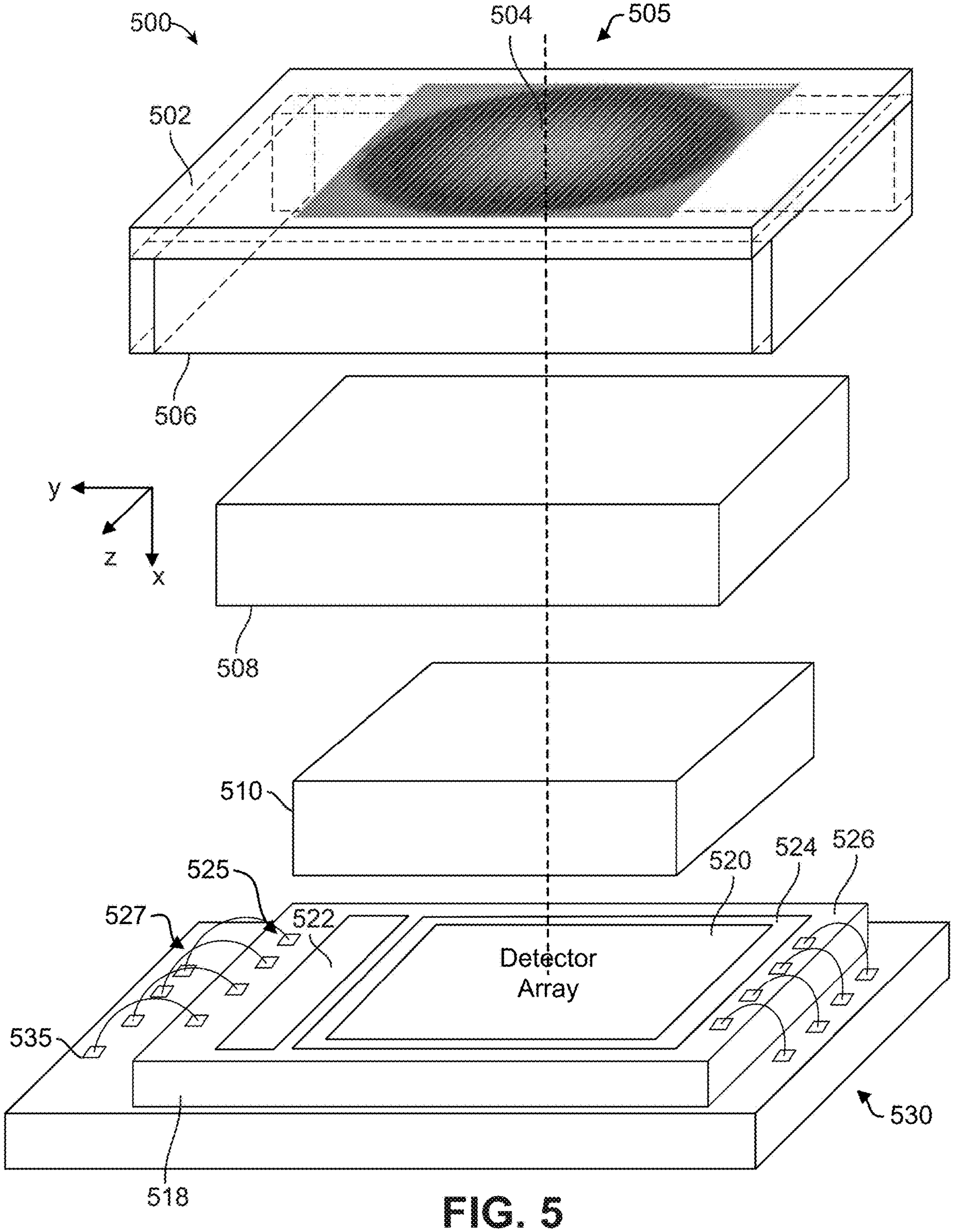
FIG. 5 is a diagram illustrating a tiered meta-lens stackup, in accordance with some examples of the present disclosure.

FIG. 5 illustrate perspective views of an example wafer stackup 500 for a meta-lens camera modules. FIG. 5 illustrates a meta-lens 504 disposed on a substrate 502, a first spacer 506 disposed on the substrate 502, a second spacer 508, a third spacer 510, a detector component 518, and a PCB 530. In some cases, a combined height of the first spacer 506, the second spacer 508, and the third spacer 510 can be configured to separate the meta-lens 504 from the detector component 518 to place the detector component 518 at the focal plane of the meta-lens 504. In some cases, the meta-lens 504 of FIG. 5 can correspond to the meta-lens 225 of FIG. 2D and FIG. 2E. In some examples, the first spacer 506 of FIG. 5 can correspond to the substrate 227 of FIG. 2D. In some aspects, the second spacer 508 of FIG. 5 can correspond to the first tiered spacer 260 of FIG. 2D. In some implementations, the third spacer 510 of FIG. 5 can correspond to the second tiered spacer 262 of FIG. 2D. In some cases, the detector component 518 of FIG. 5 can correspond to the image sensor 238 of FIG. 2D and FIG. 2E. In some examples, the detector array 520 of FIG. 5 can correspond to the active region 239 of FIG. 2E. In some aspects, the PCB 530 of FIG. 5 can correspond to the PCB 242 of FIG. 2D and FIG. 2E. In some implementations, the bond pads 525, bond pads 535, and wire bonds 527 of FIG. 5 can correspond to the bond pads 245, the bond pads 255, and the wire bonds 244 of FIG. 2E, respectively. In some cases, the microlens array 524 of FIG. 5 can correspond to the microlens array 252 of FIG. 2D and FIG. 2E.

As shown in FIG. 5, the meta-lens 504 and a detector array 520 of the detector component 518 can be aligned relative to an optical axis 505 extending along the x-axis direction. In the illustrated example of FIG. 5, the detector component 518 can include a detector array 520, circuitry 522, and bond pads 525. In some cases, the detector array 520 can include photosensitive elements that can detect light with a particular wavelength or range of wavelengths. For example, in some cases, the detector array 520 can include photosensitive elements that can detect light in the SWIR wavelength. In one illustrative example, the photosensitive elements can detect light within a narrow band centered around approximately 1400 nm wavelength.

In some aspects, the detector array 520 can include photosensitive elements that can detect visible light. In some cases, the circuitry 522 can be configured to scan the photosensitive elements in a scan pattern to read electrical signals (e.g., a voltage, current, or the like) that correspond to an amount of light detected by each photosensitive element during a particular time period (e.g., an exposure period). In some cases, a microlens array 524 can be coupled to and/or disposed on the detector component 518. As illustrated in FIG. 5, the microlens array 524 may cover the detector array 520 and extend at least partially into a peripheral region (e.g., a region outside of the detector array 520) of the detector component 518. In some cases, the microlens array 524 may be disposed on the third spacer 510 and coupled (e.g., by a transparent adhesive) to the detector component 518 in the area indicated for the microlens array 524 in FIG. 5.

In the illustrative example of FIG. 5, the first spacer 506, the second spacer 508 and the third spacer 510 can collectively form a spacer structure that provides a spacing between the meta-lens 504 and the detector array 520 of the detector component 518. For example, the spacer structure may be used to separate the meta-lens 504 from the detector array 520 by a focal length (e.g., back focal length) of the meta-lens 504. As illustrated in FIG. 5, in some cases, a cross-sectional area (e.g., in the y-z plane) of the second spacer 508 can be smaller than a cross-sectional area of the first spacer 506. Similarly, in some examples, a cross-sectional area (e.g., in the y-z plane) of the third spacer 510 can be smaller than the cross-sectional area of the second spacer 508. In the illustrated example of FIG. 5, the cross-sectional area of the third spacer 510 allows the third spacer 510 to be attached (e.g., by an adhesive) to the detector component 518 while simultaneously allowing for wire bonds 527 to provide a connection between bond pads 525 on the detector component 518 and bond pads 535 on the PCB 530.

While the example of FIG. 5 includes a first spacer 506, second spacer 508, and third spacer 510 in a spacer structure, it should be understood that a spacer structure that includes more (e.g., four or more) and/or fewer (e.g., one or two) spacers may be used without departing from the scope of the present disclosure. For example, without limitation, a single spacer (not shown) with the cross-sectional area of the third spacer 510 may be used in place of the second spacer 508 and third spacer 510.

Figure 8:
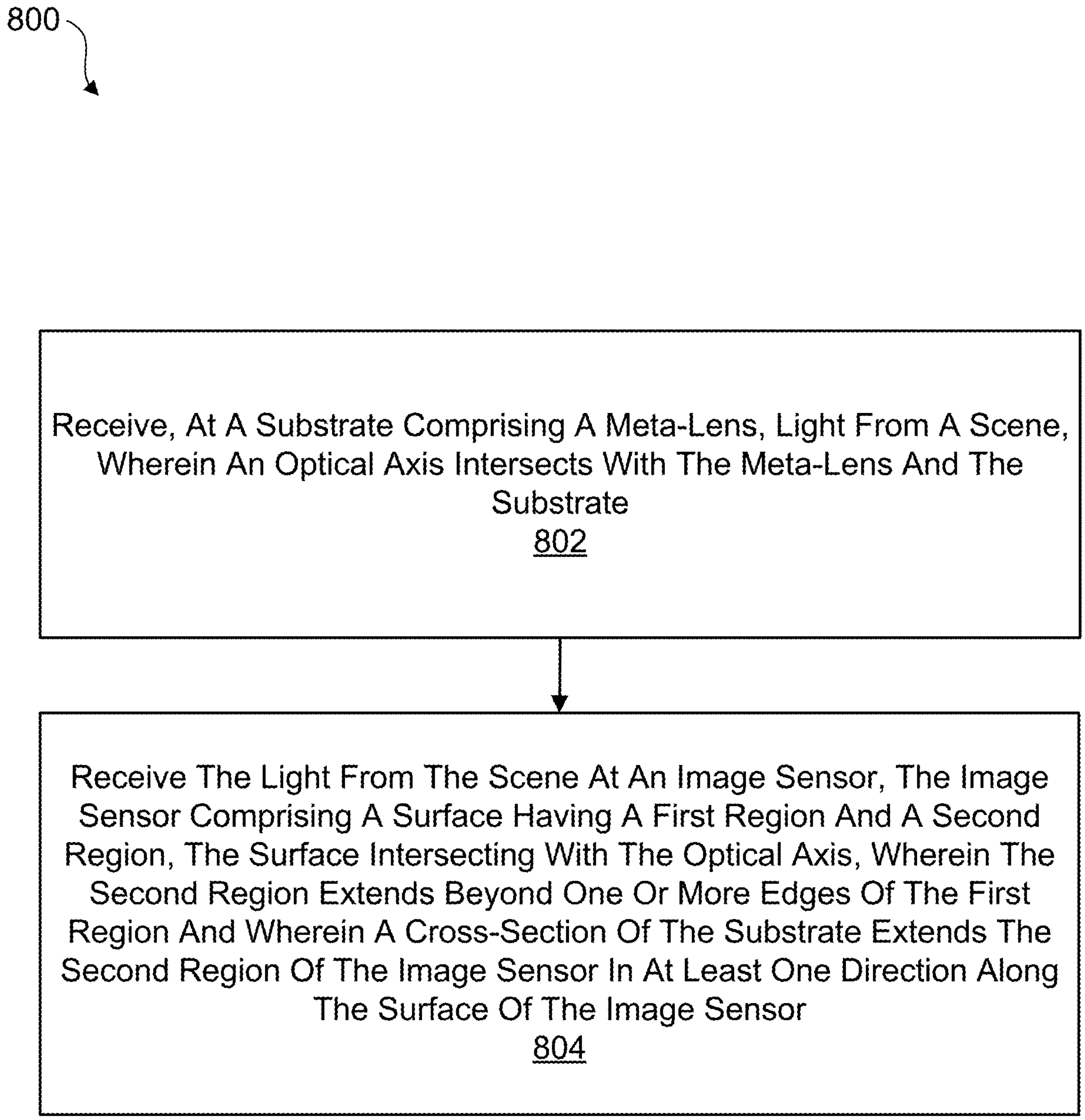
FIG. 8 is a flow diagram illustrating an example of a process for assembling a meta-lens wafer stackup, in accordance with some examples of the present disclosure.

FIG. 8 is a flow diagram of a process 800 for assembling an optical system including a meta-lens. The process 800 may be performed by a computing device (or apparatus) or a component (e.g., a chipset, codec, etc.) of the computing device. The computing device may be a mobile device, a network-connected wearable such as a watch, an XR device such as a VR device or AR device, a vehicle or component or system of a vehicle, a network node/entity/device, wireless device, or other type of computing device. The operations of the process 800 may be implemented as software components that are executed and run on one or more processors.

At block 802, the computing device (or component thereof) may receive, at a substrate including a meta-lens (e.g., meta-lens 410 of FIG. 4), light from a scene. In some cases, an optical axis (e.g., optical axis 505 of FIG. 5) intersects with the meta-lens and the substrate.

At block 804, the computing device (or component thereof) may receive the light from the scene at an image sensor (e.g., image sensor 238 of FIG. 2D and FIG. 2E, detector component 518 of FIG. 5, detector array 520 of FIG. 5), the image sensor including a surface having a first region (e.g., active region 239 of FIG. 2E) and a second region (e.g., a portion of image sensor 238 of FIG. 2E outside of the active region 239), the surface intersecting with the optical axis. In some examples, the second region extends beyond one or more edges of the first region. In some implementations, a cross-section of the substrate extends beyond the second region of the image sensor in at least one direction along the surface of the image sensor.

In some aspects, a spacer structure (e.g., substrate 227 of FIG. 2D, first spacer 506 of FIG. 5, second spacer 508 of FIG. 5, third spacer 510 of FIG. 5, and/or any combination thereof) is disposed between the substrate and the image sensor. In some examples, the spacer structure is aligned relative to the optical axis, a cross-section of the spacer structure intersects with the optical axis, and at least one edge of the cross-section of the spacer structure overlaps with the second region of the image sensor in at least one direction along the surface of the image sensor.

In some cases, the spacer structure includes a first spacer element and a second spacer element. In some examples, the first spacer element is coupled between the substrate and the second spacer element, the second spacer element is coupled between the first spacer element and the image sensor, and a contact area between the first spacer element and the second spacer element is less than an area of the second region of the image sensor. In some implementations, an additional contact area between the first spacer element and the substrate is greater than the area of the second region.

In some aspects, the spacer structure includes one or more transparent materials. In some cases, the one or more transparent materials exhibit transparency at a wavelength of light corresponding to a photosensitive light spectrum of the image sensor.

In some examples, at least one spacer included in the spacer structure includes glass, and the photosensitive light spectrum includes a portion of a visible light spectrum.

In some implementations, at least one spacer included in the spacer structure includes silicon, and the photosensitive light spectrum includes a portion of an infrared light spectrum.

In some aspects, the spacer structure is configured to provide a spacing between the meta-lens and the image sensor and the spacing corresponds to a focal length of the meta-lens.

In some cases, a first distal end of the spacer structure is coupled to the substrate. In some examples, a second distal end of the spacer structure is coupled to the image sensor. In some implementations, a microlens array is coupled between the image sensor and the substrate. In some aspects, the microlens array is aligned relative to the first region of the image sensor along the optical axis.

In some cases, the spacer structure includes the microlens array. In some examples, the microlens array includes a meta-lens microlens array. In some implementations, the meta-lens microlens array is disposed on an additional substrate, and wherein the additional substrate is coupled to the image sensor.

In some aspects, a second distal end of the spacer structure is coupled to the microlens array. In some cases, the microlens array is coupled to the second distal end of the spacer structure by a low refractive index adhesive.

In some examples, the spacer structure includes a band-pass filter element. In some implementations, the band-pass filter element comprises a band-pass filter substrate. In some aspects, a band-pass filter is disposed on the band-pass filter substrate.

In some examples, the processes described herein (e.g., process 800 and/or other process described herein) may be performed by a computing device or apparatus. For instance, the computing system 900 shown in FIG. 9 can implement the one or more of the operations of the process 800 of FIG. 8 and/or other processes described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 800 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
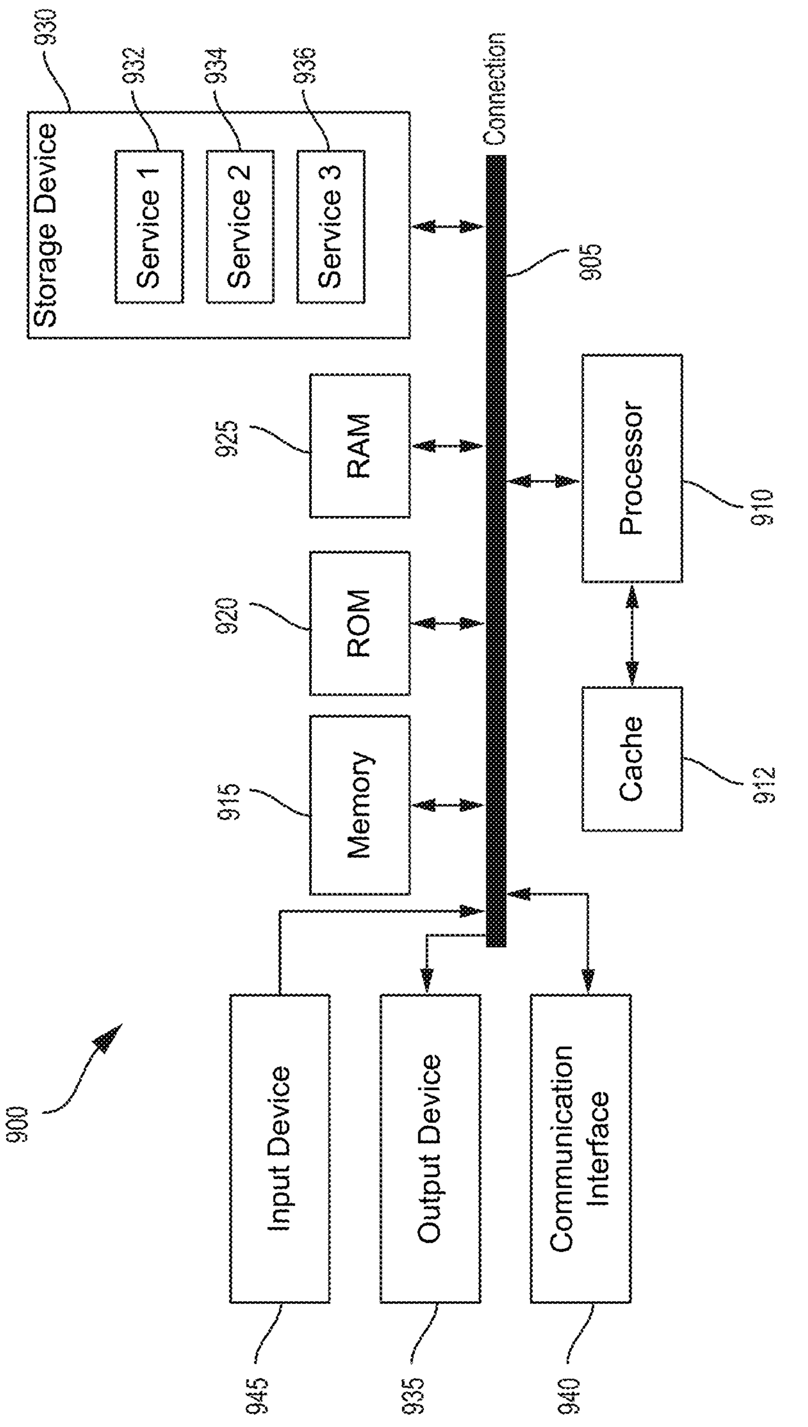
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache 912 of high-speed memory connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus comprising: an image sensor comprising a surface having a first region and a second region, the surface intersecting with an optical axis, wherein the second region extends beyond one or more edges of the first region; a substrate comprising a meta-lens, the optical axis intersecting with the meta-lens and the substrate, wherein a cross-section of the substrate extends beyond the second region of the image sensor in at least one direction along the surface of the image sensor; and a spacer structure disposed between the substrate and the image sensor.

Aspect 2: The apparatus of Aspect 1, wherein the spacer structure is aligned relative to the optical axis and coupled between the substrate and the image sensor, wherein a cross-section of the spacer structure intersects with the optical axis and at least one edge of the cross-section of the spacer structure overlaps with the second region of the image sensor in at least one direction along the surface of the image sensor.

Aspect 3: The apparatus of any one of Aspects 1 to 2, wherein the spacer structure comprises a first spacer element and a second spacer element, wherein: the first spacer element is coupled between the substrate and the second spacer element; the second spacer element is coupled between the first spacer element and the image sensor; and a contact area between the first spacer element and the second spacer element is less than an area of the second region of the image sensor.

Aspect 4: The apparatus of Aspect 3, wherein an additional contact area between the first spacer element and the substrate is greater than the area of the second region.

Aspect 5: The apparatus of any one of Aspects 1 to 4, wherein the spacer structure comprises one or more transparent materials, wherein the one or more transparent materials exhibit transparency at a wavelength of light corresponding to a photosensitive light spectrum of the image sensor.

Aspect 6: The apparatus of Aspect 5, wherein at least one spacer included in the spacer structure comprises glass, and wherein the photosensitive light spectrum comprises a portion of a visible light spectrum.

Aspect 7: The apparatus of Aspect 5, wherein at least one spacer included in the spacer structure comprises silicon, and wherein the photosensitive light spectrum comprises a portion of an infrared light spectrum.

Aspect 8: The apparatus of any one of Aspects 1 to 7, wherein the spacer structure is configured to provide a spacing between the meta-lens and the image sensor, wherein the spacing corresponds to a focal length of the meta-lens.

Aspect 9: The apparatus of any one of Aspects 1 to 8, wherein a first distal end of the spacer structure is coupled to the substrate.

Aspect 10: The apparatus of Aspect 9, wherein a second distal end of the spacer structure is coupled to the image sensor.

Aspect 11: The apparatus of Aspect 9, further comprising a microlens array coupled between the image sensor and the substrate, wherein the microlens array is aligned relative to the first region of the image sensor along the optical axis.

Aspect 12: The apparatus of Aspect 11, wherein the spacer structure comprises the microlens array.

Aspect 13: The apparatus of Aspect 11, wherein the microlens array comprises a meta-lens microlens array.

Aspect 14: The apparatus of Aspect 13, wherein the meta-lens microlens array is disposed on an additional substrate, and wherein the additional substrate is coupled to the image sensor.

Aspect 15: The apparatus of Aspect 11, wherein a second distal end of the spacer structure is coupled to the microlens array.

Aspect 16: The apparatus of Aspect 15, wherein the microlens array is coupled to the second distal end of the spacer structure by a low refractive index adhesive.

Aspect 17: The apparatus of any one of Aspects 1 to 16, wherein the spacer structure comprises a band-pass filter element.

Aspect 18: The apparatus of Aspect 17, wherein the band-pass filter element comprises a band-pass filter substrate, wherein a band-pass filter is disposed on the band-pass filter substrate.

Aspect 19: A method of optical detection, comprising: receiving, at a substrate comprising a meta-lens, light from a scene, wherein an optical axis intersects with the meta-lens and the substrate; and receiving the light from the scene at an image sensor, the image sensor comprising a surface having a first region and a second region, the surface intersecting with the optical axis, wherein the second region extends beyond one or more edges of the first region and wherein a cross-section of the substrate extends beyond the second region of the image sensor in at least one direction along the surface of the image sensor.

Aspect 20: The method of Aspect 19, wherein: a spacer structure is disposed between the substrate and the image sensor; the spacer structure is aligned relative to the optical axis; and a cross-section of the spacer structure intersects with the optical axis and at least one edge of the cross-section of the spacer structure overlaps with the second region of the image sensor in at least one direction along the surface of the image sensor.

Aspect 21: The method of Aspect 20, wherein the spacer structure comprises a first spacer element and a second spacer element, wherein: the first spacer element is coupled between the substrate and the second spacer element; the second spacer element is coupled between the first spacer element and the image sensor; and a contact area between the first spacer element and the second spacer element is less than an area of the second region of the image sensor.

Aspect 22: The method of Aspect 21, wherein an additional contact area between the first spacer element and the substrate is greater than the area of the second region.

Aspect 23: The method of any one of Aspects 20 to 22, wherein the spacer structure comprises one or more transparent materials, wherein the one or more transparent materials exhibit transparency at a wavelength of light corresponding to a photosensitive light spectrum of the image sensor.

Aspect 24: The method of Aspect 23, wherein at least one spacer included in the spacer structure comprises glass, and wherein the photosensitive light spectrum comprises a portion of a visible light spectrum.

Aspect 25: The method of Aspect 23, wherein at least one spacer included in the spacer structure comprises silicon, and wherein the photosensitive light spectrum comprises a portion of an infrared light spectrum.

Aspect 26: The method of any one of Aspects 20 to 25, wherein the spacer structure is configured to provide a spacing between the meta-lens and the image sensor, wherein the spacing corresponds to a focal length of the meta-lens.

Aspect 27: The method of any one of Aspects 20 to 26, wherein a first distal end of the spacer structure is coupled to the substrate.

Aspect 28: The method of Aspect 27, wherein a second distal end of the spacer structure is coupled to the image sensor.

Aspect 29: The method of Aspect 27, wherein a microlens array is coupled between the image sensor and the substrate, wherein the microlens array is aligned relative to the first region of the image sensor along the optical axis.

Aspect 30: The method of Aspect 29, wherein the spacer structure comprises the microlens array.

Aspect 31: The method of Aspect 29, wherein the microlens array comprises a meta-lens microlens array.

Aspect 32: The method of Aspect 31, wherein the meta-lens microlens array is disposed on an additional substrate, and wherein the additional substrate is coupled to the image sensor.

Aspect 33: The method of Aspect 29, wherein a second distal end of the spacer structure is coupled to the microlens array.

Aspect 34: The method of Aspect 33, wherein the microlens array is coupled to the second distal end of the spacer structure by a low refractive index adhesive.

Aspect 35: The method of Aspect 33, wherein the spacer structure comprises a band-pass filter element.

Aspect 36: The method of Aspect 35, wherein the band-pass filter element comprises a band-pass filter substrate, wherein a band-pass filter is disposed on the band-pass filter substrate.

Aspect 37: A non-transitory computer-readable storage medium having stored thereon instructions which, when executed by one or more processors, cause the one or more processors to perform any of the operations of aspects 19 to 36.

Aspect 38: An apparatus comprising means for performing any of the operations of aspects 1 to 36.

What is claimed is:

1. An apparatus comprising:

an image sensor comprising a surface having a detector array and a peripheral region outside of the detector array, the detector array intersecting with an optical axis, wherein the peripheral region extends beyond one or more edges of the detector array;

a substrate comprising a meta-lens, the optical axis intersecting with the meta-lens and the substrate, wherein a cross-section of the substrate extends beyond the peripheral region of the image sensor in at least one direction along the surface of the image sensor; and a spacer structure disposed between the substrate and the image sensor, the optical axis intersecting with the spacer structure, wherein a spacer element of the spacer structure is directly coupled to the detector array.

2. The apparatus of claim 1, wherein the spacer structure is aligned relative to the optical axis and coupled between the substrate and the image sensor, wherein a cross-section of the spacer structure intersects with the optical axis in a contact region where the spacer element is directly connected to the detector array.

3. The apparatus of claim 1, wherein the spacer structure comprises a first spacer element and a second spacer element, wherein:

the first spacer element is coupled between the substrate and the second spacer element;

the second spacer element is coupled between the first spacer element and the image sensor; and a contact area between the first spacer element and the second spacer element is less than an area of the peripheral region of the image sensor.

4. The apparatus of claim 3, wherein an additional contact area between the first spacer element and the substrate is greater than the area of the peripheral region.

5. The apparatus of claim 1, wherein the spacer structure comprises one or more transparent materials, wherein the one or more transparent materials exhibit transparency at a wavelength of light corresponding to a photosensitive light spectrum of the image sensor.

6. The apparatus of claim 5, wherein at least one spacer included in the spacer structure comprises glass, and wherein the photosensitive light spectrum comprises a portion of a visible light spectrum.

7. The apparatus of claim 5, wherein at least one spacer included in the spacer structure comprises silicon, and wherein the photosensitive light spectrum comprises a portion of an infrared light spectrum.

8. The apparatus of claim 1, wherein the spacer structure is configured to provide a spacing between the meta-lens and the image sensor, wherein the spacing corresponds to a focal length of the meta-lens.

9. The apparatus of claim 1, wherein a first distal end of the spacer structure is coupled to the substrate.

10. The apparatus of claim 9, wherein a second distal end of the spacer structure is coupled to the image sensor.

11. The apparatus of claim 9, further comprising a microlens array coupled between the image sensor and the substrate, wherein the microlens array is aligned relative to the detector array of the image sensor along the optical axis.

12. The apparatus of claim 11, wherein the spacer structure comprises the microlens array.

13. The apparatus of claim 11, wherein the microlens array comprises a meta-lens microlens array.

14. The apparatus of claim 13, wherein the meta-lens microlens array is disposed on an additional substrate, and wherein the additional substrate is coupled to the image sensor.

15. The apparatus of claim 11, wherein a second distal end of the spacer structure is coupled to the microlens array.

16. The apparatus of claim 15, wherein the microlens array is coupled to the second distal end of the spacer structure by a low refractive index adhesive.

17. The apparatus of claim 1, wherein the spacer structure comprises a band-pass filter element.

18. The apparatus of claim 17, wherein the band-pass filter element comprises a band-pass filter substrate, wherein a band-pass filter is disposed on the band-pass filter substrate.

19. A method of optical detection, comprising:

receiving, at a substrate comprising a meta-lens, light from a scene, wherein an optical axis intersects with the meta-lens and the substrate; and receiving the light from the scene at an image sensor, the image sensor comprising a surface having a detector array and a peripheral region outside of the detector array, the surface intersecting with the optical axis, wherein the peripheral region extends beyond one or more edges of the detector array, wherein a cross-section of the substrate extends beyond the peripheral region of the image sensor in at least one direction along the surface of the image sensor, and wherein a spacer structure is disposed between the substrate and the image sensor, a spacer element of the spacer structure being directly coupled to the detector array.

20. The method of claim 19, wherein:

a spacer structure is disposed between the substrate and the image sensor;

the spacer structure is aligned relative to the optical axis; and a cross-section of the spacer structure intersects with the optical axis and at least one edge of the cross-section of the spacer structure overlaps with the peripheral region of the image sensor in at least one direction along the surface of the image sensor.

* * * * *